(12) United States Patent
Hoeffel et al.

(10) Patent No.: US 8,346,502 B2
(45) Date of Patent: Jan. 1, 2013

(54) DETERMINATION AND WIRELESS COMMUNICATION OF SENSED VEHICLE DATA FOR COMPUTING VEHICLE SPEED

(75) Inventors: James J. Hoeffel, Lake Orion, MI (US); Kaylene Schreiber-Young, Oxford, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 343 days.

(21) Appl. No.: 12/183,459

(22) Filed: Jul. 31, 2008

(65) Prior Publication Data

US 2010/0030512 A1    Feb. 4, 2010

(51) Int. Cl.
*G01P 5/00* (2006.01)
*G01P 7/00* (2006.01)

(52) U.S. Cl. .................... 702/142; 702/141; 340/438

(58) Field of Classification Search .................. 702/141, 702/142, 145, 148; 701/135; 340/438, 439
See application file for complete search history.

(56) References Cited

U.S. PATENT DOCUMENTS

| | | | | |
|---|---|---|---|---|
| 6,801,872 | B2* | 10/2004 | Normann et al. | 702/145 |
| 2002/0036567 | A1* | 3/2002 | Larson | 340/442 |
| 2004/0143378 | A1* | 7/2004 | Vogelsang | 701/35 |
| 2008/0319611 | A1* | 12/2008 | Song | 701/41 |

* cited by examiner

*Primary Examiner* — Sujoy Kundu
(74) *Attorney, Agent, or Firm* — Ralph E Smith

(57) ABSTRACT

The present invention is a system for determining vehicle speed. The system has a sensor mounted on a wheel rotatably mounted on the vehicle for sensing centripetal acceleration of said wheel. The sensor generates a signal indicative of the sensed centripetal acceleration, and is arranged to wirelessly transmit the signal. The system additionally has an electronic control unit mounted on the vehicle. The electronic control unit is arranged to receive the signal and determine the speed of the vehicle based on the sensed centripetal acceleration.

11 Claims, 2 Drawing Sheets

DETERMINATION AND WIRELESS COMMUNICATION OF SENSED VEHICLE DATA FOR COMPUTING VEHICLE SPEED

FIELD OF THE INVENTION

The present invention relates to determining and wirelessly communicating sensed vehicle data.

BACKGROUND OF THE INVENTION

A typical contemporary land vehicle employs a speedometer—a device for displaying the vehicle's instantaneous speed. It is common for a speedometer to receive a signal representing vehicle speed from the vehicle's transmission, if the vehicle is so equipped. In such applications, a transmission output shaft is typically utilized to drive the speedometer.

The speedometer is usually driven either mechanically, via a cable, or electronically, via an electrical wire communicating a frequency of measured electronic pulses corresponding to the rotational speed of the output shaft. Whether driven mechanically or electronically, however, a physical connection is typically required to communicate rotational speed of the output shaft to the speedometer.

Such a physical connection may be subject to various assembly and durability concerns, some of which may result in the speedometer displaying incorrect vehicle speed. Additionally, the speed signal supplied by the transmission and displayed on the speedometer is typically calibrated to correspond to a diameter of wheels originally installed by the vehicle manufacturer. If the manufacturer's wheel rims and tires are subsequently replaced by those having an overall diameter that is different from the factory combination, the speedometer reading may become inaccurate.

SUMMARY OF THE INVENTION

The present invention is a system for determining and wirelessly communicating sensed vehicle data for computing vehicle speed. According to the invention, the system has a wheel rotatably mounted on the vehicle for facilitating vehicle movement relative to a road surface. The system also has a sensor mounted on the wheel for sensing centripetal acceleration of said wheel and generating a signal indicative of the sensed centripetal acceleration. The system additionally includes an electronic control unit mounted on the vehicle for wirelessly receiving the signal and for computing speed of the vehicle in response to the sensed centripetal acceleration.

According to the invention the electronic control unit may include a radio frequency receiver for wirelessly receiving the signal. The sensor may include a radio frequency transmitter for wireless communication with the receiver. The electronic control unit may communicate the computed vehicle operating parameters to a vehicle speed display.

It should be understood that the detailed description and specific examples which follow, while indicating preferred embodiments of the invention, are intended for purposes of illustration only and are not intended to limit the scope of the invention.

DETAILED DESCRIPTION OF THE INVENTION

In general, the present invention is a system for determining and wirelessly communicating sensed vehicle data for computing speed of the vehicle. According to the invention, the system may be used for displaying vehicle speed on a vehicle speedometer.

Figure 1:
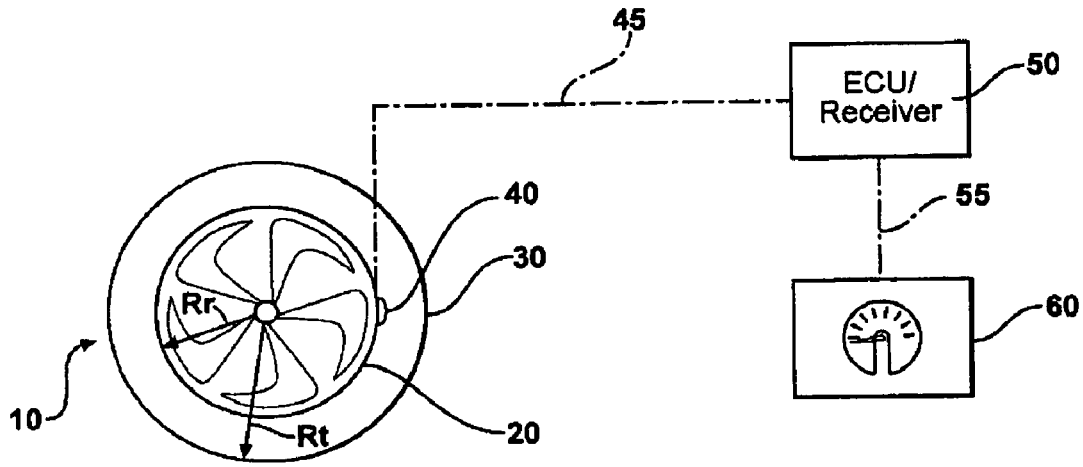
FIG. 1 is a schematic view of a system for determining and wirelessly communicating sensed vehicle data for computing speed of the vehicle according to the invention.

Referring now to the drawings, like elements of the invention are identified with identical reference numerals throughout. FIG. 1 denotes a schematic view of the system having a wheel 10. Wheel 10 is typically mounted on a vehicle for facilitating the vehicle's movement. Wheel 10 includes a rim 20 which is a generally rigid structure for supporting a vehicle's mass. Rim 20 is typically mounted via a wheel hub to a vehicle suspension (not shown). Rim 20 has an outer radius $R_r$. Tire 30 is mounted on rim 20. Tire 30 may be a pneumatic or solid polymer composite ring-like structure, and is typically fitted for shock absorption and protection of the rim. Tire 30 has an outer radius $R_t$. Sensor 40 is a wireless accelerometer mounted on the rim on radius $R_r$. Sensor 40 is arranged for sensing and monitoring centripetal acceleration of the sensor $a_s$ when the wheel is in motion. Centripetal acceleration of the sensor $a_s$ will increase in response to an increase in rotational speed of the wheel, which is the basis for determining the speed of the vehicle. Sensor 40 may include a separate or integrated radio frequency transmitter, or any other communication device capable of wirelessly transmitting the sensed centripetal acceleration $a_s$ signals. Sensor 40 transmits the sensed acceleration $a_s$ wirelessly to electronic control unit (ECU) 50. ECU 50 may include a radio frequency receiver, as shown, for wirelessly receiving the sensor signals. ECU computes speed of the vehicle according to a series of mathematical relationships, i.e. equations, using the sensed centripetal acceleration of the sensor.

Figure 2:
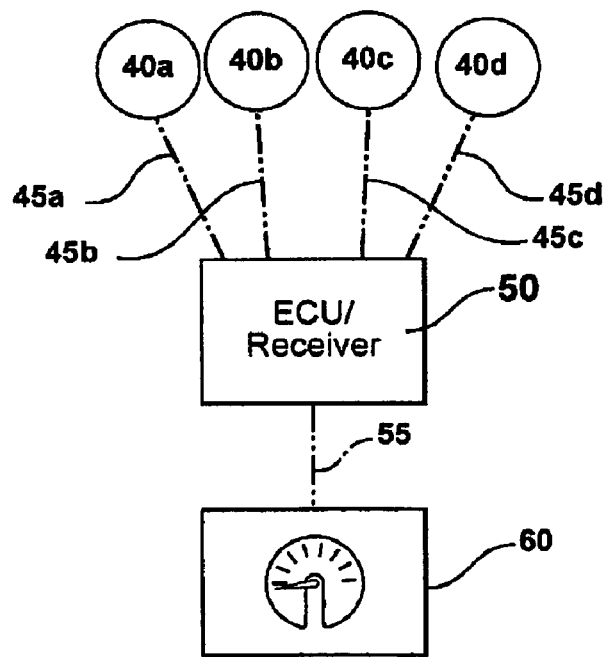
FIG. 2 is a schematic diagram of the system having four sensors according to the invention.

On a typical land vehicle having four wheels, a sensor may be positioned on each individual rim. FIG. 2 shows four sensors 40A, 40B, 40C and 40D in communication with ECU 50 via a radio frequency receiver through a wireless connection 45. The wireless connection may be effected via a radio frequency particularly chosen for the application. The radio frequency receiver may be integrally mounted on ECU 50 (shown in FIGS. 1 and 2), or utilized as a stand alone unit (not shown) mounted on the vehicle in electronic communication with the ECU. Providing an individual sensor for each respective wheel allows sensing centripetal acceleration at each of the vehicle's four wheels. Utilizing a plurality of sensors, one sensor per wheel, and transmitting those signals wirelessly to the ECU, may permit the ECU to determine vehicle speed based on the average of all sensor signals. Additionally, sensing centripetal acceleration at each wheel may allow the ECU to detect slip of an individual wheel relative to the road surface by assessing speed difference between the four individual wheels.

Assuming the vehicle is in motion and all wheels are rotating at a constant speed, centripetal acceleration of the sensor $a_s$ is directly related to the tangential velocity of the rim $v_s$, i.e. tangential sensor velocity, and rim radius $R_r$.

$$a_s = v_s^2 / R_r;$$  Equation 1 same equation transposed yields $$v_s = (a_s \times R_r)^{1/2}$$

Consistent with the original assumption that the vehicle is moving at a constant speed, angular velocity of the wheel $\omega_w$ is equal to the rim tangential velocity $v_s$ divided by the rim radius $R_r$.

$$\omega_w = v_s/R_r \quad \text{Equation 2}$$

In a case of an object rotating about an axis, every point on the object has same angular velocity. Since angular velocity of all points on the wheel will have the same magnitude, angular velocity of the tire $\omega_t$ will be equal to angular velocity of the wheel $\omega_w$, i.e. $\omega_w = \omega_t = \omega$. The tangential velocity of any point on the rotating object is equal to the angular velocity multiplied by the distance of the axis to the point in question. Hence, the tangential velocity of the vehicle $v_v$ is equal to the angular velocity of the tire $\omega_t$ multiplied by the tire radius $R_t$.

$$v_v = \omega_t \times R_t \quad \text{Equation 3}$$

Substitute equation 2 into equation 3.

$$v_v = (v_s/R_r) \times R_t = v_s \times (R_t/R_r) \quad \text{Equation 4}$$

Therefore, vehicle tangential velocity $v_v$ is proportional to the sensor velocity $v_s$. Substitute equation 1 into equation 4.

$$v_v = v_s \times (R_t/R_r) = (a_s \times R_r)^{1/2} \times (R_t/R_r) \quad \text{Equation 5}$$

Therefore, vehicle velocity $v_v$ can be determined by the sensor acceleration, when the tire radius $R_t$ and the rim radius $R_r$ are known. Thus determined vehicle velocity $v_v$ may be communicated by ECU 50 to speedometer 60 via a common electronic communication line 55 for displaying vehicle speed to the vehicle operator (shown in FIGS. 1 and 2), or via a wireless connection.

Tire radius $R_t$ and the rim radius $R_r$ are selected as part of the vehicle design process, hence they are both known. These wheel parameters may be entered into the ECU at the vehicle assembly plant, or in the field, i.e. after the vehicle has been put into service, using a service tool or an operator interface. Capability to update the tire radius $R_t$ and the rim radius $R_r$ information in the field allows the speedometer to be conveniently recalibrated to display correct vehicle speed, thereby supporting a vehicle being retrofitted with tire and wheel sizes different from those being used previously.

Figure 3:
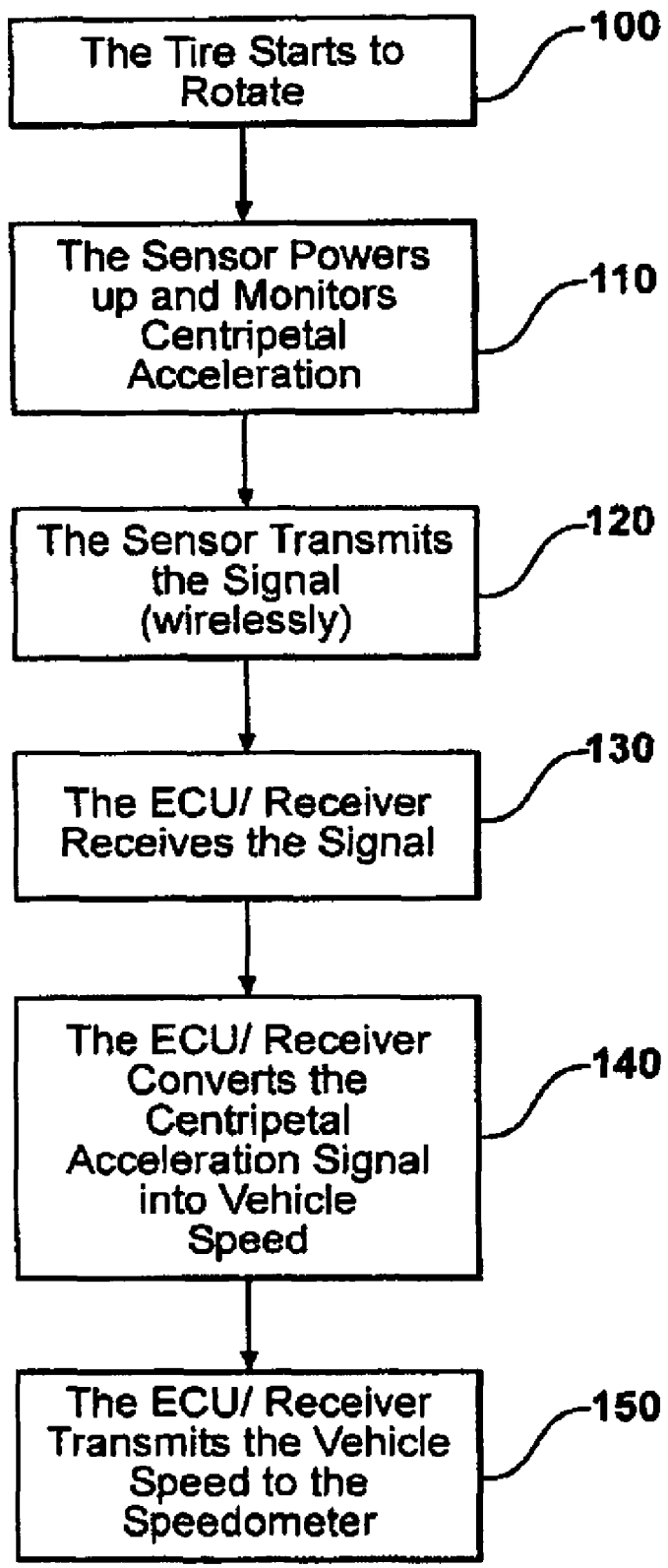
FIG. 3 is a method flow-chart according to the invention.

FIG. 3 shows a method corresponding to the invention described in connection with FIGS. 2 and 3. As shown, the method is activated in block 100 when the tire begins to rotate. The method proceeds to block 110, where the sensor mounted on the wheel powers up and commences monitoring centripetal acceleration $a_s$. The method then proceeds to block 120, where the sensor wirelessly transmits a signal representative of the sensed centripetal acceleration $a_s$. In block 130 a receiver, which is in electronic communication with the ECU and capable of wirelessly receiving the sensed centripetal acceleration as, receives the signal. Then, the method proceeds to block 140, where the ECU computes vehicle speed, as described above. In block 150, the ECU transmits the computed vehicle speed for display on the speedometer. Consequently, the method provides continuous wireless communication of the sensed centripetal acceleration for determining instantaneous vehicle speed and providing a speed reading on the speedometer.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for determining speed of a vehicle having a wheel rotatably mounted thereto for facilitating vehicle movement relative to a road surface, the system comprising:

a sensor configured for mounting to the wheel, the sensor configured for sensing centripetal acceleration of the wheel and generating a signal indicative of sensed centripetal acceleration, the sensor arranged to wirelessly transmit the signal;

an electronic control unit configured for receipt of data associated with the wheel, the electronic control unit further configured to receive the signal from the sensor mounted to the wheel and determine speed of the vehicle based on the sensed centripetal acceleration from the signal received and from the data associated with the wheel; and the electronic control unit further configured for receipt of replacement data associated with a replacement wheel substituted for the wheel and operative to determine speed of the vehicle based on sensed centripetal acceleration and on the replacement data.

2. The system of claim 1, wherein the electronic control unit receives the signal via a radio frequency and the sensor includes a radio frequency transmitter for wireless communication with the receiver.

3. The system of claim 1, wherein the electronic control unit communicates the determined speed to a vehicle display.

4. The system of claim 1, wherein the electronic control unit determines the wheel is in a slip condition based on the sensor signal.

5. The system of claim 1, wherein the data associated with the wheel and the replacement wheel includes a rim radius.

6. The system of claim 1, wherein the data associated with the wheel and the replacement wheel includes a tire radius.

7. A vehicle having a wheel rotatably mounted on the vehicle for facilitating vehicle movement relative to a road surface comprising:

a display unit mounted on the vehicle for receiving and displaying vehicle speed;

a sensor configured for mounting to the wheel, the sensor configured for sensing centripetal acceleration of the wheel and generating a signal indicative of sensed centripetal acceleration, the sensor arranged to wirelessly transmit the signal;

an electronic control unit configured for receipt of data associated with the wheel, the electronic control unit further configured to receive the signal from the sensor mounted to the wheel and determine speed of the vehicle based on the sensed centripetal acceleration from the signal received and from the data associated with the wheel, the electronic control unit further configured for transmitting the computed speed to the vehicle display unit, wherein the vehicle speed is displayed; and the electronic control unit further configured for receipt of replacement data associated with a replacement wheel substituted for the wheel, the electronic control unit operative to determine speed of the vehicle based on sensed centripetal acceleration and on the replacement data and to recalibrate the vehicle display to correct displayed speed in accordance with the replacement data.

8. The vehicle of claim 7, wherein the electronic control unit receives the signal via a radio frequency and the sensor includes a radio frequency transmitter for wireless communication with the receiver.

9. The vehicle of claim 7, wherein the electronic control unit determines the wheel is in a slip condition based on the sensor signal.

10. The vehicle of claim 7, wherein the data associated with the wheel and the replacement wheel includes a rim radius.

11. The vehicle of claim 7, wherein the data associated with the wheel and the replacement wheel includes a tire radius.

* * * * *